Figure 1:
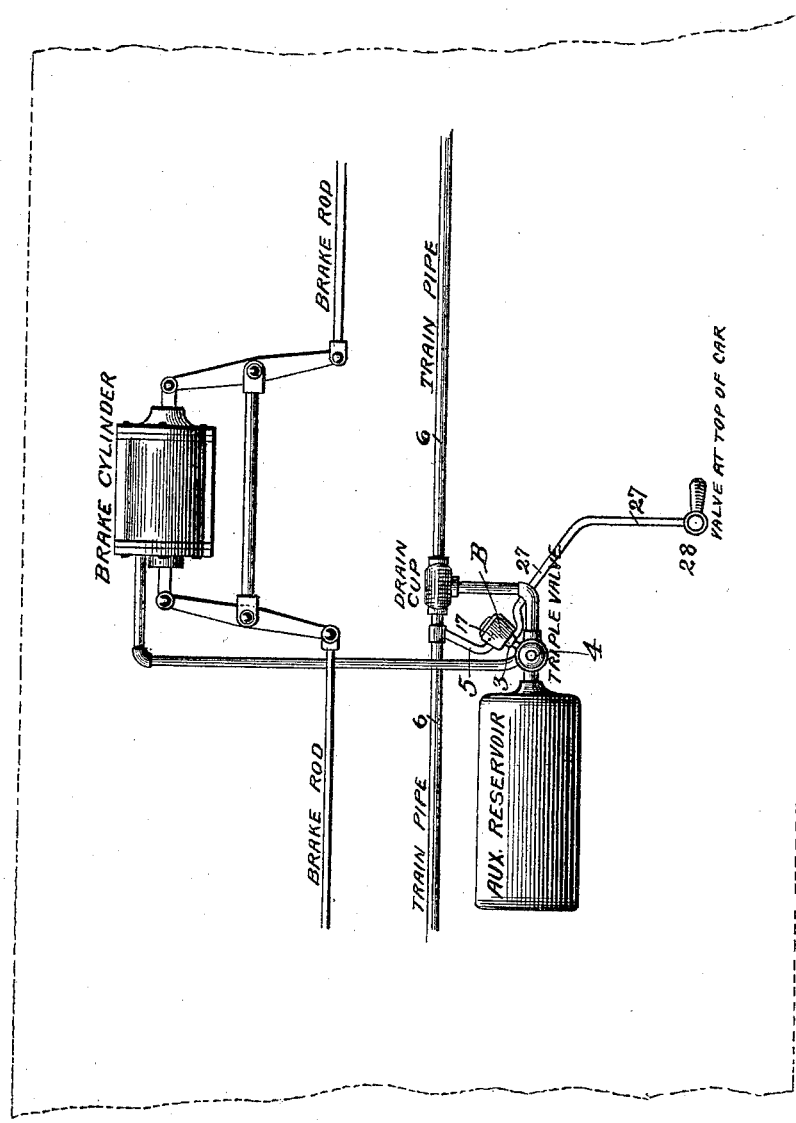

No. 622,633. Patented Apr. 4, 1899.
W. PALMER, Jr.
VALVE FOR AIR BRAKE SYSTEMS.
(Application filed Jan. 19, 1898.)
(No Model.) 2 Sheets—Sheet 1.

WITNESSES: Jos. A. Ryan, Amos W. Hart

INVENTOR William Palmer Jr.
BY Munn & Co.
ATTORNEYS.

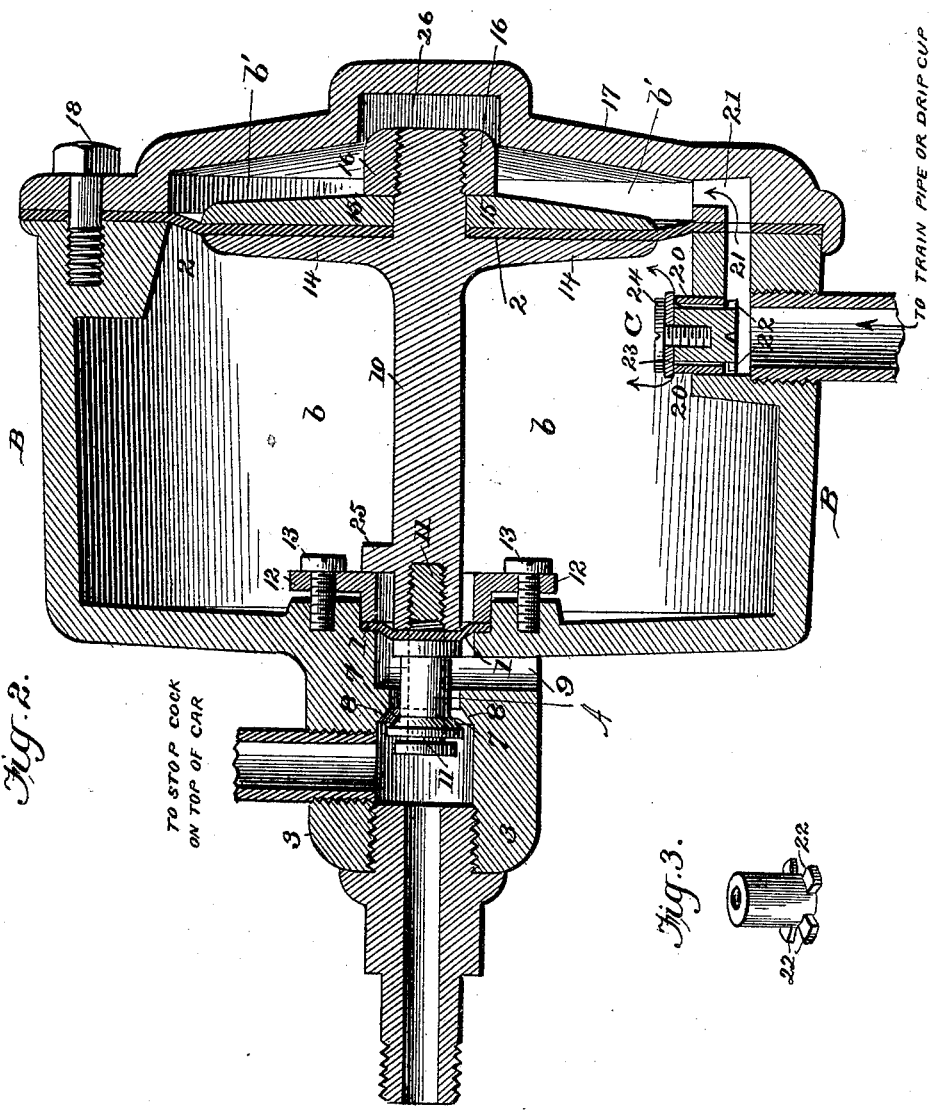

UNITED STATES PATENT OFFICE.

WILLIAM PALMER, JR., OF RINCON, TERRITORY OF NEW MEXICO.

VALVE FOR AIR-BRAKE SYSTEMS.

SPECIFICATION forming part of Letters Patent No. 622,633, dated April 4, 1899.

Application filed January 19, 1898. Serial No. 667,150. (No model.)

*To all whom it may concern:*

Be it known that I, WILLIAM PALMER, Jr., of Rincon, in the county of Donna Ana, in the Territory of New Mexico, have invented a new and Improved Automatic Pressure-Retaining Valve for Air-Brake Systems, of which the following is a specification.

My invention is applicable to the ordinary or Westinghouse air-brake system.

In descending heavy grades it is often desirable or necessary to recharge the auxiliary reservoir; but to do this involves temporary release of the brakes, since the passage between such reservoir and the brake-cylinder is closed during the recharging operation, and the air in the cylinder is also discharged. My invention enables the auxiliary reservoir to be recharged without release of the brakes and prevents the waste of air that would otherwise exhaust to the atmosphere from the brake-cylinder. So soon as the auxiliary reservoir has been recharged the air-pressure in the brake-cylinder may be increased from the reservoir, thus applying the brakes with renewed or greater force.

Automatic valves for retaining pressure in the brake-cylinder while the auxiliary reservoir is being recharged have been devised, but have mainly failed to meet all requirements in practical use. I have devised an automatic valve of this character which possesses novel features and is reliable in use. Its construction and operation are hereinafter set forth in detail by reference to accompanying drawings, in which—

Figure 1 is a plan view illustrating the connection and arrangement of my pressure-retaining valve in a Westinghouse air-brake system. Fig. 2, Sheet 2, is an enlarged longitudinal section of such valve. Fig. 3 is a detail view of a check-valve forming an attachment of the pressure-retaining valve.

I illustrate in the drawings only so much of the ordinary air-brake system as is necessary to ready comprehension of my improved attachment thereto.

While my invention is popularly termed a "valve," it is, in fact, in the nature of an apparatus, (see Fig. 2,) since in addition to the automatic retaining-valve proper, A, it comprises an air-holder B, of which said valve is an attachment; also, two flexible diaphragms 1 and 2, which are contained within said air-holder B, and an auxiliary air inlet and check valve C, likewise attached to the air-holder.

My improved apparatus is connected with the ordinary air-brake system at two points, as follows: The boss 3, that projects from the end of the air-holder B and in which the retaining-valve proper, A, works, is screw-coupled with the ordinary triple-valve case 4 at the air-exhaust port of the latter, and the other connection is established by the pipe 5, which is coupled to the train-pipe 6 and attached to the side of the air-holder B, Fig. 1, at the point where the auxiliary or air inlet and check valve C is located. (In place of this attachment being made directly to the train-pipe it might be made to the drain-cup of the triple valve without change in the operation and result.)

The retaining-valve A, Fig. 2, has a tubular cylindrical body and a beveled flange 7, that seats at the point 8 within the chamber of the aforesaid boss 3. The latter has a lateral air-exhaust port 9 at a point outside the seat 8. The valve A is secured to the elongated stem 10 by means of a screw 11, that passes through it and into the stem, as shown. A thin diaphragm 1, of rubber, rubber cloth, or similar material, which is duly flexible and impervious to air, is clamped centrally between the valve A and stem 10, and its edges are similarly held to the adjacent body of the air-holder B by means of a gland or flanged ring 12 and attaching-screws 13. A similar but larger diaphragm 2 is clamped to the head or enlarged end 14 of the valve-stem by means of a perforated washer 15 and nut 16, while the edges of said diaphragm 2 are clamped between the body and cap 17 of the air-holder B by means of screws 18. The aforesaid diaphragms 1 and 2 make the main chamber $b$ practically air-tight, and at the same time allow due reciprocating movement of the retaining-valve A for opening and closing it. Said chamber $b$ is termed the "storage-chamber" and the smaller one, $b'$, on the opposite side of diaphragm 2, is termed the "pressure-chamber" for convenience of reference.

The auxiliary air-valve C is arranged adjacent to and in line with the mouth of the pipe 5, that extends to the train-pipe 6. It is held and fits loosely in a bushing 20, held in an opening provided in the inner wall of an air-passage 21, leading from said pipe 5 to the space or pressure-chamber $b'$ between the diaphragm 2 and cap 17 of the air-holder B. The valve proper, C, has a stop-flange 22 at one end, and a rubber disk 23 is attached to its opposite end by means of a screw 24, having a broad flat head. The edge of such disk 23 projects over the inner end of the bushing 20, which, in effect, forms a seat for the same, so as to prevent air passing out through the annular space between the bushing and valve-body without, however, seriously hindering its passage in the opposite direction—i. e., inward. In other words, the flexibility of the disk 23 allows air to pass in, but the disk seats when air-pressure is applied in the opposite direction. Thus the valve C as a whole operates as an automatic air-inlet and air-check, according to the direction in which pressure is applied. It will be seen the space or chamber $b'$ is at all times in free communication with the train-pipe through passage 21, while the valve C allows or cuts off communication between the train-pipe 6 and main or storage chamber $b$ of the air-holder B, as the case may be. The function of the valve C is in brief to retain the air-pressure in said chamber $b$ when that in the train-pipe has been reduced, as will be further explained. It will be noted in this connection that the flange 22 on the outer end of valve C is merely a check limiting its movement inward, while the lug 25 on the stem 10 of valve A performs a like function for the latter valve when it strikes on the gland 12. The nut 16 on the head of said stem 10 works in a recess 26 in cap 17 and serves as a guide for preventing undue lateral oscillation.

From the boss 3 of the air-holder B, at a point exterior to the retaining-valve A, a pipe 27 is attached, which extends to the top of the car, where it is provided with a stop-cock 28, that is conveniently accessible to trainmen.

The operation of my invention is as follows: It may be properly first stated that in the present system of automatic air-brakes seventy pounds pressure is generally carried in the train-pipe and auxiliary reservoir, while the main reservoir has twenty pounds excess pressure. When the engineer's brake-valve is in the running position, the train-pipe pressure will not exceed seventy pounds whatever be the excess pressure in main reservoir; but, as is well known, when the engineer's brake-valve is in the release position the train-pipe pressure equals that of the main reservoir. Just before a train reaches a heavy descending grade the engineer should place the brake-valve in release position for about five seconds, which will admit the excess pressure of the main reservoir to the train-pipe, and thereby also to both the storage and pressure chambers $b$ and $b'$ of the air-holder B, since the air will pass through pipe 5, past the auxiliary valve C, and through the passage 21, as indicated by arrows in Fig. 2. Pressure being thus applied on both sides of the diaphragm 2, the retaining-valve A will remain in its normal open position, as shown by full lines, Fig. 2. Then when the grade is reached in order to recharge the auxiliary reservoir the engineer places the brake-valve in running position and the triple valve moves to release position, which allows air to enter the auxiliary reservoir, while the retaining-valve A remains seated, and thus holds the brake-cylinder pressure on the brakes, or, in other words, prevents exhaust of air from brake-cylinder air-exhaust port 9 into the atmosphere. When the auxiliary reservoir has been thus charged to seventy pounds pressure, such pressure can then be availed of to reinforce the pressure in the brake-cylinder. It is apparent that during the operation above described the cock 28 of the vertical air-pipe 27 must be closed. To release the brakes, place the engineer's brake-valve in release position for about five seconds. This will admit the excess pressure of main reservoir into the train-pipe and chamber $b'$ at head of air-holder B, which overcomes the storage-pressure in the storage-chamber $b$, and consequently forces the retaining-valve A back to its normal or open position, so that air may exhaust from the brake-cylinder through air-exhaust port 9 into the atmosphere. To partly but not wholly release the brakes, place engineer's brake-valve in release position for about one second, then return said brake-valve to the running position, which will result in allowing a portion of the air in brake-cylinder to exhaust and release the brakes to a corresponding degree, since the retaining-valve A will be held open but about one second and then automatically close on account of reduction of train-pipe pressure by feeding into auxiliary reservoir. To recapitulate, the retaining-valve A automatically closes by reduction of pressure in train-pipe and will not open until the pressure is restored to about the same degree as is in chamber $b$, and by placing the engineer's brake-valve in release position and admitting the excess pressure to train-pipe it will charge the chamber $b$ of air-holder B to a higher pressure than that normally carried in the train-pipe when the brake-valve is in running position, and the auxiliary reservoir can be recharged to seventy pounds pressure without releasing the brakes by merely placing the brake-valve in running position, since it requires the excess pressure to be admitted into the train-pipe from the main reservoir in order to open the retaining-valve.

The stop-cock 28 at top of car should only be closed when descending heavy grades. When open, air will exhaust from the brake-cylinder through pipe 27 regardless of the action of the retaining-valve.

What I claim is—

1. The combination with an automatic air-brake system comprising a main reservoir, train-pipe, auxiliary reservoir, brake-cylinder, and triple valve, of the improved air-pressure-retaining valve or apparatus, comprising the air-holder, the retaining-valve proper working in an opening and boss of said air-holder, flexible diaphragms to which such valve is connected within latter, said diaphragms being arranged substantially as described to form air storage and pressure chambers on opposite sides of the larger one, and an automatic air inlet and check valve, which is arranged in the side of the air-holder and governs communication with the storage-chamber, such valve or apparatus being connected with the triple-valve exhaust and the train-pipe, substantially as shown and described.

2. In an automatic air-brake system of the character described, the combination with the triple valve and train-pipe, and suitable connections, of the improved automatic air-pressure-retaining valve or apparatus comprising the air-holder having a boss with lateral outlet and valve seats, the retaining-valve proper, flexible diaphragms within the air-holder, forming storage and pressure chambers as specified, the automatic air inlet and check valve, and the air-exhaust provided with a stop-cock and pipe connected with the triple valve and with the said apparatus at a point exterior to the retaining-valve, substantially as shown and described to operate as specified.

3. The improved retaining valve or apparatus, consisting of the air-holder having two flexible, differentiated diaphragms arranged in its storage-chamber, the retaining-valve proper A, attached to the stem connecting said diaphragms, the air-passage communicating with said valve and adjacent diaphragm, the lateral opening of the air-holder and passage leading therefrom to space above the larger diaphragm, and the automatic auxiliary valve C, arranged adjacent to said opening and governing communication between it and the storage-chamber, as shown and described.

4. In the improved retaining valve or apparatus for the use specified, the combination with the air-holder having a side opening and passage, and the train-pipe connection, as specified, of the automatic air inlet and check valve, arranged in an opening formed in the inner wall of said passage, and having a flexible rubber disk attached to the inner end of its body and the connected diaphragms and retaining-valve arranged as specified, whereby the air admitted from train-pipe at the side opening acts on one of said diaphragms, or is admitted to storage-chamber, as shown and described.

5. The combination with the triple valve, auxiliary reservoir, and connections, of the retaining valve or apparatus comprising the air-holder having the end boss provided with longitudinal and lateral passages and adapted to screw into the triple-valve case, the interior diaphragm and the retaining-valve, both arranged in said boss, and the larger flexible diaphragm, 2, arranged in the outer end of the air-holder, and connected with the smaller one, 1, all operating as shown and described.

WILLIAM PALMER, JR.

Witnesses:
ACHESON McCLINTOCK,
OSCAR WOOD.